United States Patent
Moerke (10) Patent No.: US 6,683,279 B1
(45) Date of Patent: Jan. 27, 2004

(54) TWIN MIG WELDING APPARATUS

(76) Inventor: Delford A. Moerke, 1020 Shady Oak Dr., North Mankato, MN (US) 56003-3435

( * ) Notice: Subject to any disclaimer, the term of this patent is extended or adjusted under 35 U.S.C. 154(b) by 26 days.

(21) Appl. No.: 10/034,965

(22) Filed: Dec. 27, 2001

(51) Int. Cl.[7] ................................................. B23K 9/28
(52) U.S. Cl. ..................................... 219/137.2; 219/74
(58) Field of Search ........................ 219/137.21, 137.62, 219/74

(56) References Cited

U.S. PATENT DOCUMENTS

| | | | |
|---|---|---|---|
| 2,866,079 A | * 12/1958 | Morley, Jr. et al. | 219/137.44 |
| 3,007,033 A | * 10/1961 | Newman et al. | 219/137 R |
| 3,694,620 A | 9/1972 | Gleason | |
| 3,716,422 A | 2/1973 | Ing et al. | |
| 3,978,310 A | 8/1976 | Gleason | |
| 4,147,917 A | * 4/1979 | Jelmorini | 219/121.46 |
| 4,181,256 A | 1/1980 | Kasagi | |
| 4,370,538 A | 1/1983 | Browning | |
| 4,393,298 A | * 7/1983 | Frantzreb, Sr. | 219/137.62 |
| 4,582,979 A | 4/1986 | Moerke | |
| 4,600,824 A | 7/1986 | Moerke | |
| 4,604,306 A | 8/1986 | Browning | |
| 4,762,977 A | 8/1988 | Browning | |
| 4,902,873 A | 2/1990 | Ivannikov | |
| 4,960,458 A | 10/1990 | Browning | |
| 5,149,939 A | 9/1992 | Imaizumi et al. | |
| 5,155,330 A | * 10/1992 | Fratiello et al. | 219/137 R |
| 5,258,599 A | 11/1993 | Moerke | |
| 5,714,735 A | 2/1998 | Offer | |
| 5,977,504 A | 11/1999 | Offer et al. | |
| 5,994,659 A | 11/1999 | Offer | |
| 6,172,333 B1 | * 1/2001 | Stava | 219/137 PS |

OTHER PUBLICATIONS

D/F Machine Specialities, Inc. Drawing entitled "1,000 amp–two wire torch", prior to 2000.

* cited by examiner

Primary Examiner—Tom Dunn
Assistant Examiner—Len Tran
(74) Attorney, Agent, or Firm—Seyfarth Shaw LLP (57) ABSTRACT

A dual-electrode arc welding apparatus includes a body assembly adapted to be coupled to a source of electric power and directing two wire electrodes through a nozzle assembly to an associated workpiece at a working end of the apparatus. The body assembly is provided at a distal end with an adapter which channels the electrodes respectively through passages of a tip assembly in electrical contact with the adapter and the body assembly for conducting electric power to the electrodes. The tip assembly is removable from the adapter without removing the nozzle assembly and, upon removal of the nozzle assembly, the adapter is removable from the body assembly. The tip assembly may include a single tip body with dual passages therethrough or two discrete tips separately mounted on the adapter by either threaded engagement therewith or by being slidably received in externally threaded nipples and secured by collet nuts. Similarly, the adapter may be collet-mounted or threadedly engaged with the body assembly. Devices both with and without provisions for shielding gas are disclosed and fluid-cooled nozzle assemblies and body assemblies are disclosed. In certain embodiments, the electrodes are powered from separate power sources respectively connected to electrically separated first and second body members of a body assembly. The nozzle assembly may be removably mounted directly on the body assembly or on a docking body which is, in turn, removably mounted on the body assembly.

21 Claims, 11 Drawing Sheets

TWIN MIG WELDING APPARATUS

BACKGROUND

This application relates to welding apparatus and systems and, particularly, to arc welding systems such as Metal Inert Gas ("MIG") arc welding systems.

Typically, a MIG welding system includes a welding gun or torch assembly which feeds a consumable wire electrode through a current pick-up tip which applies welding potential to the electrode. The gun or torch assembly includes a main housing to which is removably mounted a welding nozzle which surrounds the welding tip and may channel an inert shielding gas to the welding arc. The nozzle assembly may be air or water cooled. The welding gun or torch assembly must be serviced with the utilities which it requires for operation, such as water for cooling, gas for shielding the welding arc and electricity to effect the welding, as well as being provided with the consumable wire electrode. All of these utilities are fed to the welding gun or torch assembly from associated supplies via utilities delivery means, which may include a portable utilities station of the type disclosed in my U.S. Pat. No. 4,210,796.

When the welding system is to be utilized in mechanized or automated applications, the welding torch assembly is in the form of a machine barrel which is fixedly mounted on the automated welding control equipment. For example, the machine barrel may be mounted on a permanent fixed mount to which workpieces are delivered for welding or, alternatively, might be mounted on a movable mount, such as that of a robotic welding machine, which moves to the workpiece under remote control, and which may be pre-programmed.

It is known to provide nozzles and welding tips in such welding systems which are easily replaceable without disconnection of the systems from utilities supplies, arrangements of this type being disclosed, for example, in my U.S. Pat. Nos. 4,600,824 and 4,582,979.

In certain types of MIG welding applications, it is desirable to utilize two separate electrodes, and it is known to provide such dual-electrode or twin welding devices. However, heretofore, such dual-electrode devices have not afforded easy removability and replaceability of parts without requiring disconnection of utility supplies, as was afforded in the single-electrode devices of my aforementioned patents.

Furthermore, it is sometimes desirable to operate the two electrodes of a dual-electrode welding apparatus from two different power supplies, referred to herein as a "tandem" arrangement, and prior systems have not adequately provided for this.

SUMMARY

This application discloses an arc welding apparatus which avoids the disadvantages of prior apparatuses while avoiding additional structural and operating advantages.

An important aspect of the invention is the provision of a dual-electrode arc welding apparatus which includes a current-pickup tip assembly which can be simply and easily removed and replaced without affecting any utilities supplies.

A further aspect is the provision of a welding apparatus of the type set forth, which permits removal of the tip assembly without affecting the position of the remainder of the apparatus. of the type set forth which utilizes different types of removable tip assemblies.

A still further aspect is the provision of an apparatus of the type set forth, wherein the tip assembly is coupled to the apparatus via an adapter which is also removably mountable independently of a surrounding nozzle assembly.

Yet another aspect is the provision of an apparatus of the type set forth, wherein the two electrodes are respectively provided with separate power supplies.

Certain ones of these and other aspects may be attained by providing, in an arc welding apparatus for delivering two wire electrodes to a workpiece and including a body assembly adapted to be coupled to a source of electric power and directing the electrodes toward a working end of the apparatus, and a nozzle assembly removably coupled to the body assembly for channeling other utilities to the working end, the improvement comprising: an adapter electrically and mechanically coupled to the body assembly for receiving the electrodes therefrom and maintaining the electrodes spaced from each other, and a tip assembly removably mounted on the adapter in electrical connection therewith and defining two channels for respectively slidably receiving and electrically contacting the electrodes and guiding them to the associated workpiece, whereby the tip assembly is removable from the apparatus without removing the nozzle assembly or the adapter.

Other aspects may be attained by providing a body assembly with first and second discrete bodies electrically insulated from each other and respectively connected to separate power supplies.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
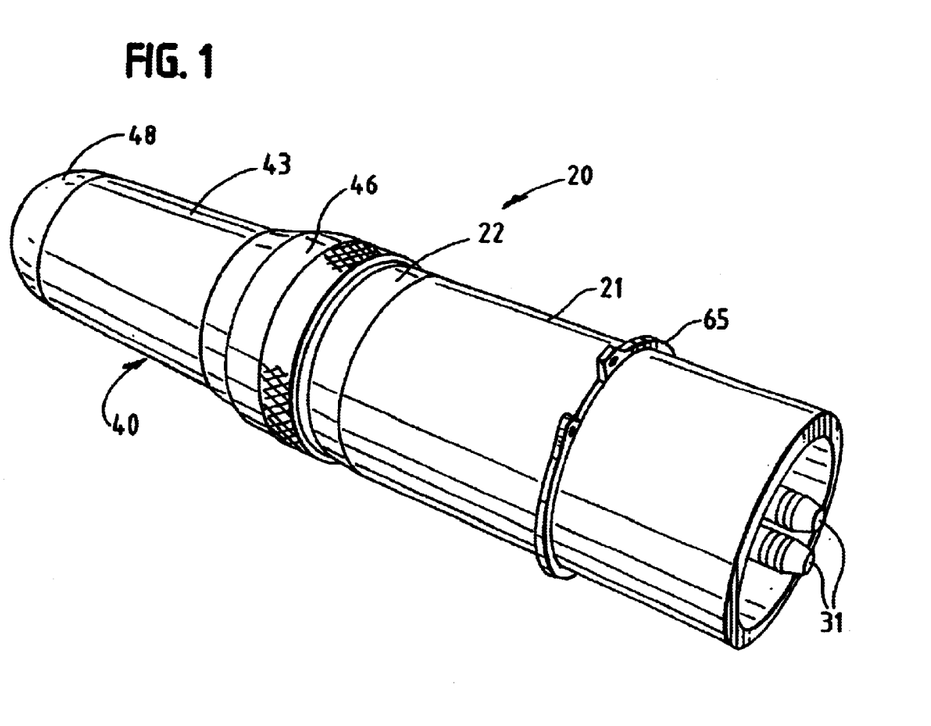
FIG. 1 is a rear perspective view of a dual-electrode or twin arc welding torch assembly in the form of a machine barrel adapted for robotic mounting.
Figure 2:
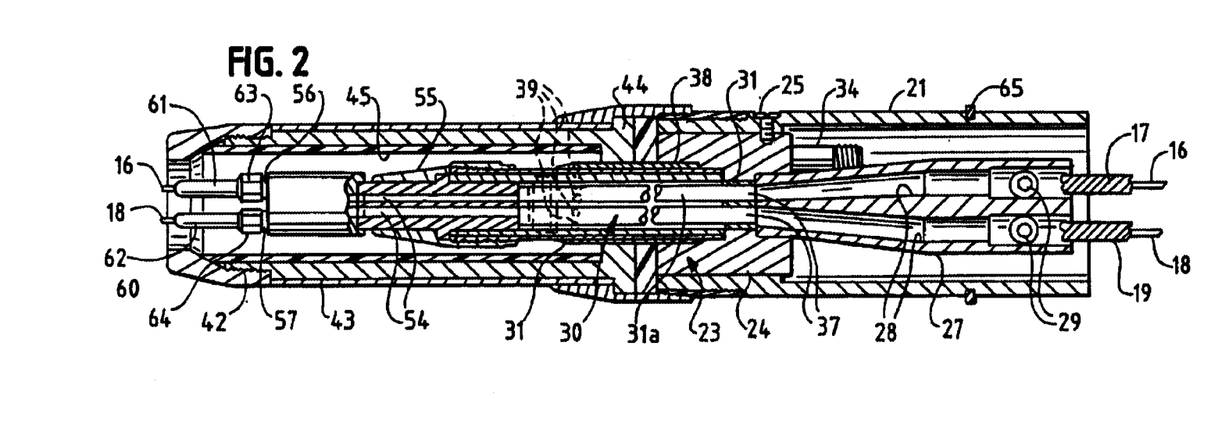
FIG. 2 is a view in horizontal section through the assembly of FIG. 1.
Figure 3:
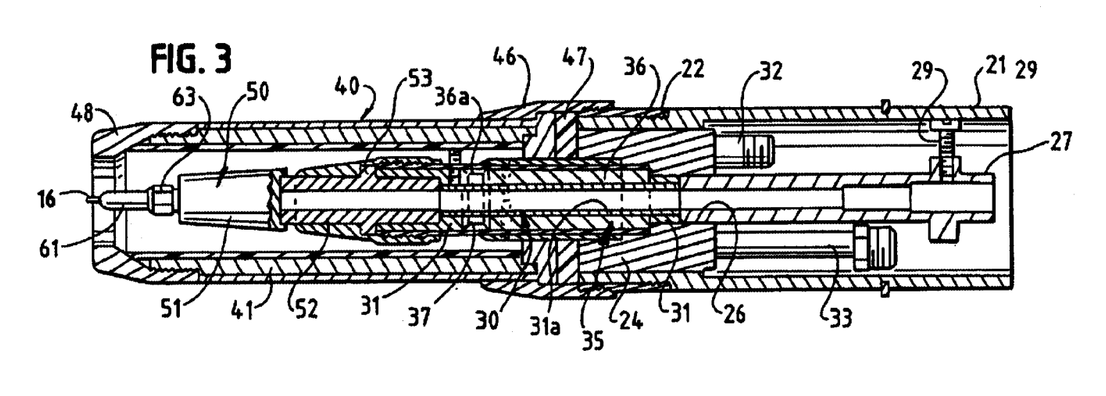
FIG. 3 is a view in vertical section through the assembly of FIG. 1.

Referring now to FIGS. 1–3, there is illustrated a MIG welding machine barrel, generally designated by the numeral 20, designed for mounting on a robotic welder, at which the machine barrel 20 is provided with welding utilities, including two wire electrodes 16 and 18, respectively provided with flexible support liners 17, 19, in a known manner. The machine barrel 20 is also provided with a connection to a suitable electric welding power source, the machine barrel 20 serving to deliver the welding power to the electrodes 16, 18. The machine barrel 20 is designed for use with an arc shielding gas and is fluid-cooled and, therefore, the utilities provided also include a source of shielding gas and cooling fluid, typically water.

The machine barrel 20 has a cylindrical housing 21, formed of a suitable electrically insulating material and having provided at one end thereof an externally threaded collar 22 for connection to a nozzle assembly 40. Mounted within the housing 21 is a body assembly 23 which includes a cylindrical body spool 24 fixedly secured in position at the forward end of the housing 21, as by a mounting screw 25. The body spool 24 has formed therethrough a plurality of passages for receiving and passing therethrough the various utilities, in a manner generally described in my aforementioned U.S. Pat. Nos. 4,582,979 and 4,600,824, although it will be understood that the specific sizes and routings of the passages will vary to accommodate the particular utilities used and to accommodate the fact that the machine barrel 20 utilizes two electrodes. More specifically, the body spool 24 has formed therethrough a stepped central bore 26, in the rear end of which is fixedly secured the forward end an electrode fixture 27, which has two discrete passages 28 formed therethrough for respectively receiving the support liners 17 and 19 and their respective electrodes 16 and 18, the liners being respectively locked in position, as by set screws 29.

Forwardly of the fixture 27, the central bore 26 receives a liner support 30 provided with fittings 31 at its forward and rearward ends supporting therebetween a pair of parallel tubes 31a, respectively communicating with the forward ends of the passages 28 in the fixture 27. Fixed to the rear end of the body spool 24 and communicating with a water inlet passage therein is a water inlet fitting 32 adapted to be connected to an associated source of cooling water (not shown). Similarly, a water out fitting 33 is connected to a water out passage of the body spool 24 and is adapted for coupling to a suitable drain. Typically, the water out fitting 33 will also be provided with a suitable cable for connection to the associated source of electric power, although it will be appreciated that other types of electrical connections could be utilized. A gas fitting 34 for connection to a shielding gas supply is also connected to the rear end of the body spool 24 in communication with a gas passage therein in a known manner.

Secured to the body spool 24 and projecting forwardly therefrom in surrounding relationship with the liner support 30 is an inner body 35 including an inner tube 36 having an annular channel 36a formed in the outer surface thereof near the forward end thereof, and an outer tube 37 which closes the channel 36a to define an annular water chamber within the outer tube 37. The outer tube 37 is, in turn, surrounded by a gas shell 38 having an array of circumferentially spaced holes 39 therethrough near the forward end thereof and which cooperates with the outer tube 37 for defining therebetween a gas channel which communicates with the gas passage (not shown) in the body spool 24 for channeling the shielding gas forwardly, to exit through the holes 39, again in a known manner.

The nozzle assembly 40 is connected to the forward end of the housing 21 and includes a cylindrical inner body 41 which has a reduced-diameter, externally threaded forward end 42 and is surrounded with a cylindrical outer shell 43. The nozzle assembly 40 is provided at its rearward end with a radially outwardly extending annular collar 44. The inner surface of the inner body 41 is lined with an electrically insulating sleeve 45. The nozzle assembly 40 is secured to the housing 21 by a cone nut 46, which has an internal shoulder which engages the collar 44, the nut 46 being threadedly engaged with the threaded collar 22. Preferably, the nozzle collar 44 is spaced from the forward end of the body spool 24 by an electrically insulating, generally cylindrical collar 47, provided with openings therethrough for receiving the inner body 35 and water fittings (not shown) on the rear end of the nozzle 40 which plug into the forward ends of the water channels in the body spool 24 in a manner described in my aforementioned patents, and also described hereinafter in connection with FIGS. 12 and 13, for delivering water to and discharging water from circulation channels (not shown) in the nozzle assembly 40. The collar 47 serves to electrically insulate the nozzle assembly 40 from the body spool 24, which is electrically hot. The water channels in the body spool 24 also communicate with the rear ends of channels between the inner and outer tubes 36 and 37 of the inner body 35, the channels being defined by flats (not shown) on the outer surface of the inner tube 36 and communicating at their forward ends with the annular channel 36a to cool the inner body 35. A cylindrical gas nozzle 48 may be threadedly engaged with the forward end of the inner body 41, again in a known manner.

It is a significant aspect of the machine barrel 20 that there is secured to the forward end of the inner body 35 an adapter 50, which includes a body 51 provided with a rearwardly extending cylindrical extension 52 provided intermediate its ends with a radially outwardly projecting flange 53. The adapter 50 defines two electrode passages 54 therethrough, which are designed to respectively communicate with the tubes 31a of the liner support 30. Preferably the rearward end of the extension 52 slidably fits inside the forward end of the inner tube 36 of the inner body 35. The forward end of the outer tube 37 is externally threaded for threaded engagement with a cone nut 55 which draws the flange 53 snugly against the forward end of the inner body 35. The body 51 of the adapter 50 is provided at its forward end with externally threaded nipples 56 and 57, which respectively communicate with the passages 54.

Secured to the forward end of the adapter 50 is a tip assembly 60 which, in this embodiment, includes two cylindrical electrical pickup tips 61 and 62 which are respectively slidably received within the nipples 56 and 57 of the adapter 50. Preferably, these nipples are longitudinally slotted to form collets, the tips 61 and 62 being respectively secured in place by collet nuts 63 and 64 which threadedly engage the nipples 56 and 57 and radially compress them in a known manner to securely grip the tips 61 and 62 and lock them in position, so that the forward ends of the tips 61 and 62 are respectively disposed just inside the forward end of the gas nozzle 48, as can best be seen in FIGS. 2 and 3.

In operation, the machine barrel 20 is slipped into a suitable support ring or the like on a robotic mount, being positioned by a positioning ring 65 received in a complementary groove in the outer surface of the housing 21 for bearing against the associated support ring and accurately positioning the machine barrel. The machine barrel is connected to the associated utilities in a known manner. The electrodes and their associated support liners are fitted into the fixture 27, the support liners 17 and 19 being respectively stopped at the adapter nipples 56 and 57, at which depth of insertion they are locked in place by the set screws 29, the electrodes 16 and 18 still being slidably movable through the support liners 17 and 19 and into the tips 61 and 62 for delivery to the associated workpiece (not shown). The shielding gas exits the gas shell 38 into the rear end of the nozzle assembly 40, where it flows forwardly in surrounding relationship with the adapter 50 and the associated electrodes for exiting the gas nozzle 48 around the electrodes 16 and 18 to shield the welding arcs in a known manner. Cooling water flows into the fitting 34, through internal passages in the body spool 24 through suitable fittings (not shown) on the collar 44, down a passage in the nozzle assembly 40 to the forward end where it recirculates around an annular passage and returns through another nozzle collar fitting and body spool passage to the water out fitting 33, again all in a known manner.

It will be appreciated that, in the event that the tips 61 and 62 become damaged in use or otherwise need repair or replacement, they can readily be removed by simply unscrewing the gas nozzle 48 and then unscrewing the collet nuts 63 and 64, without removing either the nozzle assembly 40 or the adapter 50. Furthermore, if need be, the adapter 50 can also be readily removed by simply unscrewing the nozzle assembly 40 at the cone nut 46 and removing it to provide access to the cone nut 55. It will be appreciated that the tips 61 and 62 are electrically hot and impart electrical current to the consumable electrodes 16 and 18 which pass through the tips 61 and 62 in sliding contact therewith, these electrodes being fed from associated supply reels, or the like (not shown) in a known manner.

Figure 4:
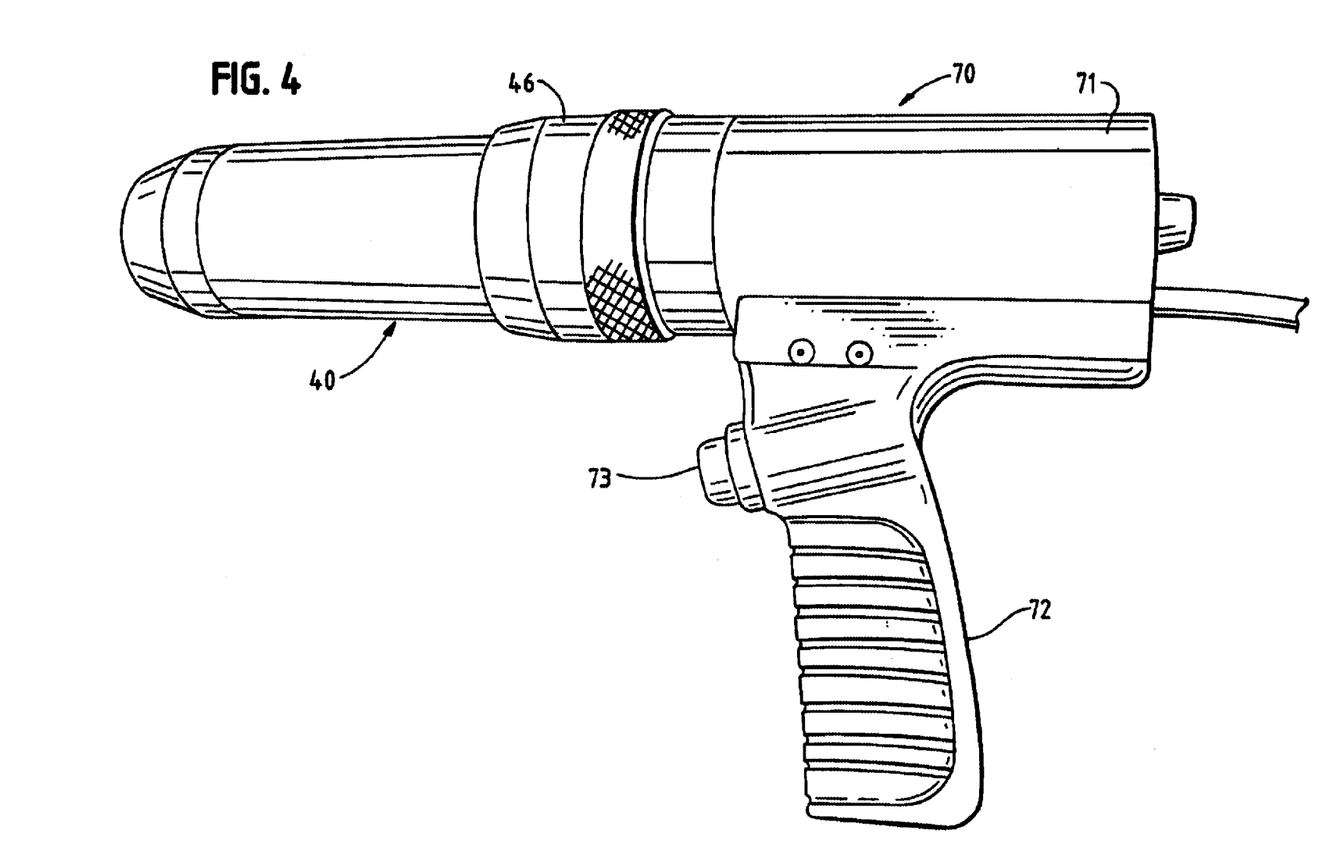
FIG. 4 is a side elevational view of an arc welding gun assembly.
Figures 5, 6:
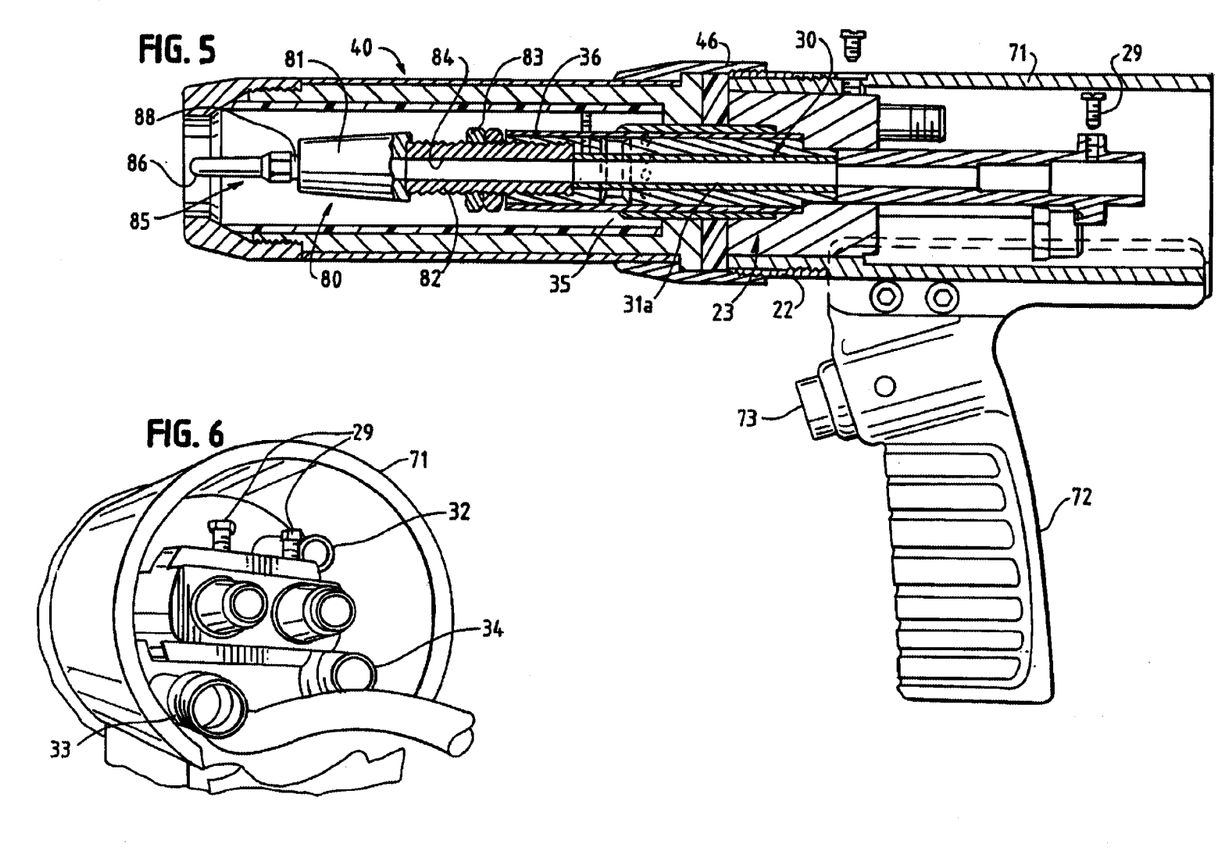
FIG. 5 is a view in partial vertical section of the gun assembly of FIG. 4.
FIG. 6 is an enlarged, fragmentary, rear perspective view of the gun assembly of FIG. 5.

Referring now to FIGS. 4–6, there is illustrated a welding gun 70 which is similar to the machine barrel 20, except that it is designed for hand-held operation. More specifically, the welding gun 70 has a housing 71 which is similar to the housing 21 described above, except that it has a handle 72 secured thereto and depending therefrom, the handle 72 being provided with a trigger button 73 for actuating an associated switch (not shown) connected in circuit with the electrical power supply. Mounted in the housing 71 is substantially the same body assembly 23 as is described above in connection with FIGS. 1–3. However, in this case, the forward end of the inner tube 36 of the inner body 35 is internally threaded and has secured thereto an adapter 80, which includes a body 81 with a rearwardly projecting cylindrical extension 82 threadedly engaged with the inner body 35 and secured with jam nuts 83. The adapter 80 defines two electrode passages 84 (one shown) which respectively communicate with the tubes 31a in the liner support 30 of the body assembly 23. The forward ends of the passages 84 in the body 81 are internally threaded for receiving a tip assembly 85, which includes two current pick-up tips 86 (one shown) having externally threaded ends 88 adapted to be respectively threadedly engaged in the body 81. Mounted on the forward end of the housing 71 is the same nozzle assembly 40 described above.

The operation of the welding gun 70 is substantially the same as that described above for the machine barrel 20. It will be appreciated that either of the machine barrel 20 or the welding gun 70 could be adapted for use with either of the adapters 50 and 80 and with either the slip-in tips 61, 62, or the threaded tips 86. However, the adapter and tip arrangement illustrated in FIGS. 1–3 is preferred, since it permits installation of the adapter without rotation thereof so that the proper alignment of the passages therein with the passages in the body assembly 23 can more easily be assured. This arrangement facilitates mounting of bent or curved current tips without interfering with each other, and it also permits easier adjustment of the depth of insertion of the tips so that their distal ends can more accurately be positioned relative to the distal end of the nozzle assembly 40.

Figure 7:
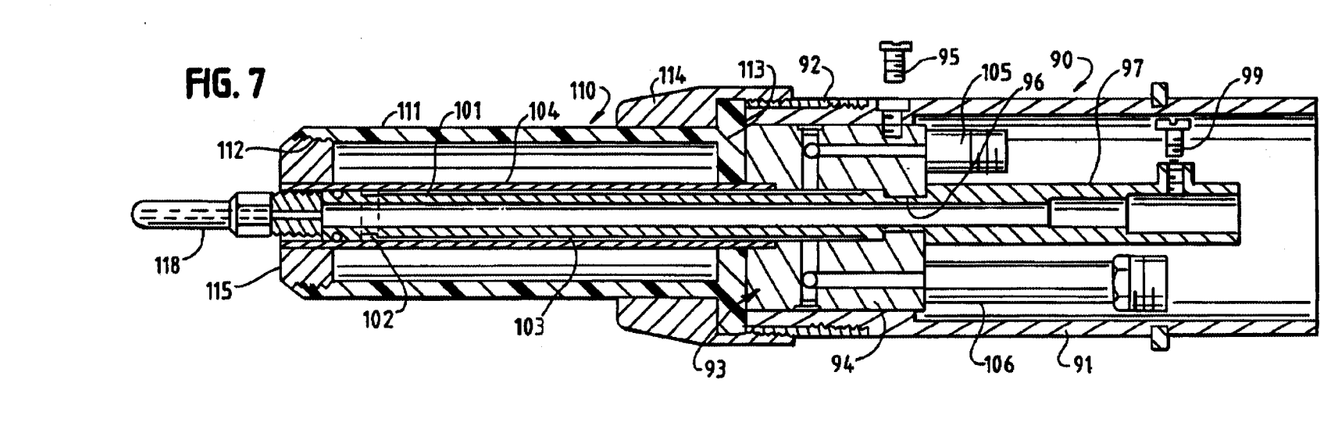
FIG. 7 is a view similar to FIG. 3 of another embodiment of machine barrel assembly.
Figure 8:
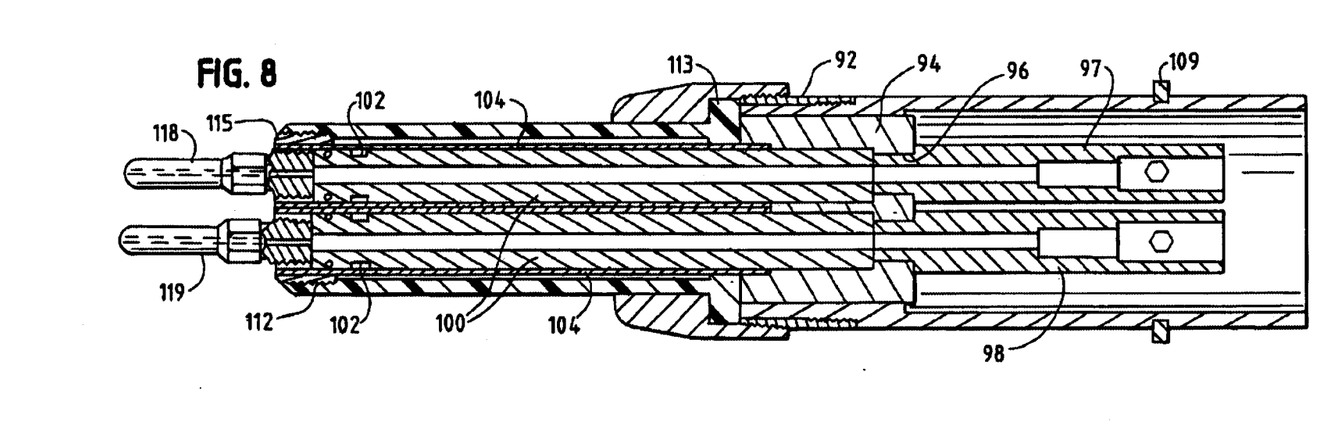
FIG. 8 is a view similar to FIG. 2 of the machine barrel of FIG. 7.

Referring now to FIGS. 7 and 8, there is illustrated a welding torch assembly in the form of a machine barrel 90 which is similar to the machine barrel 20, described above, except in this case there is no provision for shielding gas and the cooling fluid is provided only to the inner body, and not to the nozzle assembly. More specifically, the machine barrel 90 has a cylindrical, electrically insulating housing 91, threadedly engaged at its forward end with an externally threaded collar 92. Mounted in the housing 91 is a body assembly 93 which includes a body spool 94 secured in place by a screw 95. Formed through the body spool 94 are two side-by-side, stepped central bores 96 in which are respectively mounted two electrode fixtures 97 and 98, each provided with a set screw 99 for fixing in position the support liner of the associated electrode.

Also respectively mounted in the central bores 96 and projecting forwardly from the body spool 94 are two elongated, cylindrical inner bodies 100, each having formed in its outer surface two diametrically opposed, longitudinally extending channels 101 and 103, joined at their forward ends by a circumferential or annular channel 102. Each of the inner bodies 100 is telescopically received within an outer sleeve 104 which closes the channels 101 and 102 and is fixedly secured in place, as by brazing, soldering or the like. The rear ends of the channels 101 of the inner bodies 100 are connected through internal porting in the body spool 94 to a water inlet fitting 105, which is adapted to be coupled to a suitable water supply, while the rear end of the channels 103 of the inner bodies 100 are connected through internal porting of the body spool 94 to a water out fitting 106, which is adapted to be connected to a suitable drain. Thus, it will be appreciated that cooling water can be circulated down the length of each of the inner bodies 100, around its distal end and then back along its entire length. Again, electrical connection can be made through the water out fitting 106. The housing 91 is provided with a positioning ring 109 for accurately positioning the machine barrel 90 in an associated robotic support, as described above.

Mounted on the forward end of the housing 91 is an electrically insulating nozzle assembly 110 having a cylindrical outer tube 111 having an internally threaded distal end 112 and provided at its proximal end with a radially outwardly projecting annular collar 113 having a central opening therethrough for receiving the inner bodies 100, and being secured in place on the housing 91 by a cone nut 114 which threadedly engages the collar 92. Threadedly engaged in the distal end of the nozzle outer tube 111 is a support disk 115 having openings therethrough for respectively receiving and supporting the forward ends of the inner bodies 100. Preferably the outer sleeves 104 of the inner bodies 100 project forwardly beyond the ends of the inner bodies 100 and are internally threaded for respectively threadedly receiving current pickup tips 118, 119, which may be substantially the same as the tips 86, described above.

Figure 9:
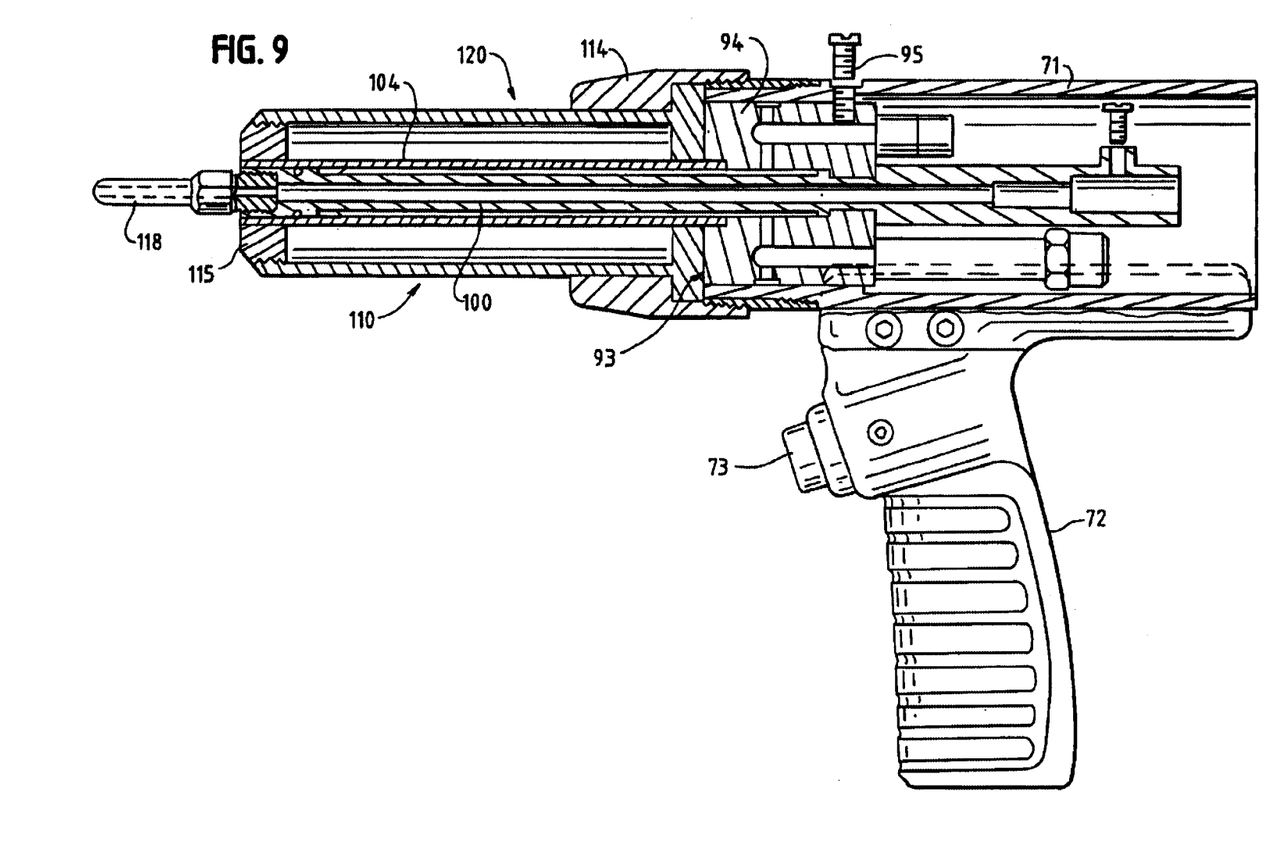
FIG. 9 is a view similar to FIG. 5 of another embodiment of arc welding gun assembly.

Referring now to FIG. 9, there is illustrated a welding gun 120 which is internally substantially the same as the machine barrel 90, described above, except that instead of the housing 91 there is provided the gun-type housing 71 of FIG. 5 with its attached handle 72 and associated trigger button 73, to provide a hand-held version of the machine barrel 90 of FIGS. 7 and 8.

Figure 10:
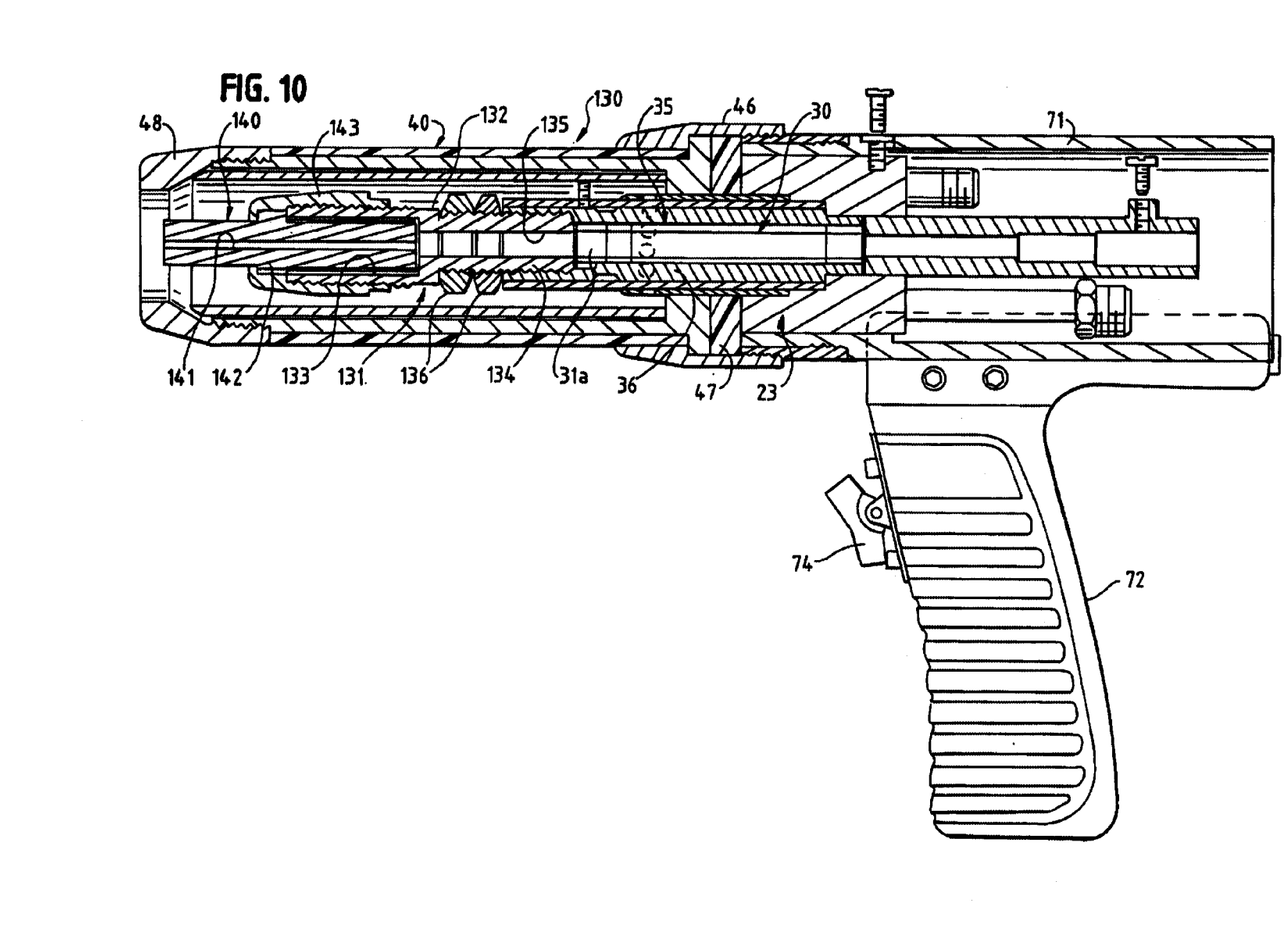
FIG. 10 is a view similar to FIG. 5 of still another embodiment of arc welding gun assembly.

Referring now to FIG. 10, there is illustrated a welding gun 130, which is substantially the same as the welding gun 70 described above in connection with FIGS. 4–6, except that it utilizes a different type of adapter and tip assembly. In this case, there is provided an adapter 131 having a cylindrical body 132 which defines therein a cylindrical socket 133, and is provided with a reduced-diameter, rearwardly extending, externally threaded cylindrical extension 134 defining two electrode passages 135 (one shown) which communicate respectively with the tubes 31a in the liner support 30. The extension 134 is threadedly engageable in the forward end of the inner tube 36 of the inner body 35, being secured in place by jam nuts 136. The passages 135 communicate with the socket 133, the latter receiving a cylindrical two-hole tip body 140 defining therein two parallel, side-by-side electrode passages 141 (one shown), respectively communicating with the passages 135 in the adapter 131. The depth of insertion of the tip body 140 in the socket 133 is limited by a radially outwardly extending shoulder 142 on the tip body 140 which engages the forward end of the adapter 131, being secured in place by a cone nut 143, which engages external threading on the adapter body 132.

Referring now to FIGS. 11–16, there is illustrated a welding torch assembly in the form of a tandem machine barrel 150 which is similar to the twin machine barrel 20 described above in connection with FIGS. 1–3, except that it is designed for powering of the two electrodes respectively with different power supplies. The welding torch 150 utilizes a housing 21a similar to the housing 21 of the machine barrel 20 and supports therein a body assembly 151 which includes an outer cylindrical spool 152 formed of a suitable electrically insulating material and telescopically received in the forward end of the housing 21A. The spool 152 defines therethrough a large cylindrical central passage 153 and two parallel outer passages 154 and 155. The central passage 153 is separated into two generally semi-cylindrical portions by an insulating divider plate 156. An electrically insulating collar 157, which may be formed of nylon, is fitted against the forward end of the outer spool 152 for a purpose to be explained more fully below.

The body assembly 151 includes two body spools 160, 160A which are formed as substantially mirror images of each other and are, respectively, disposed on opposite sides of the divider plate 156 in the central passage 153 and, therefore, only one will be described in detail. The body spool 160 has an electrode passage 161 formed therethrough, as well as water passages 162 and 163 and a shielding gas passage 164 (see FIG. 16).

Figure 11:
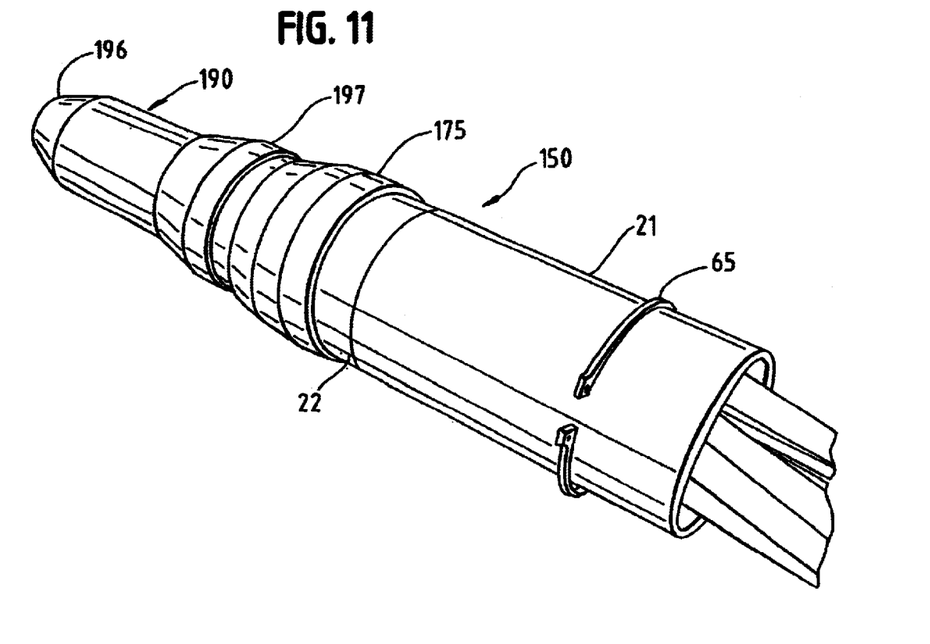
FIG. 11 is a rear perspective view of a dual-electrode arc welding machine barrel assembly powered by two separate power supplies.
Figure 12:
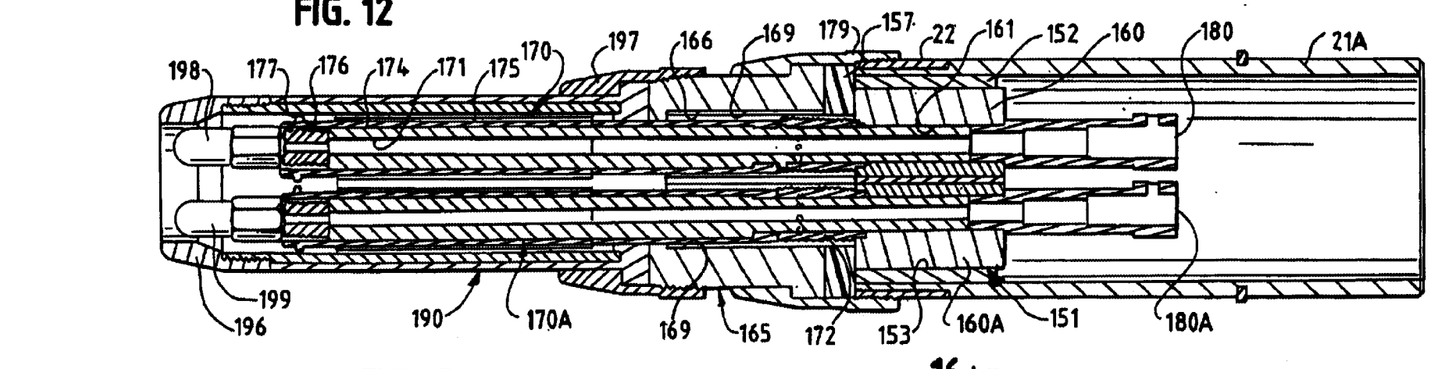
FIG. 12 is an enlarged view in horizontal section through the machine barrel assembly of FIG. 11.
Figure 13:
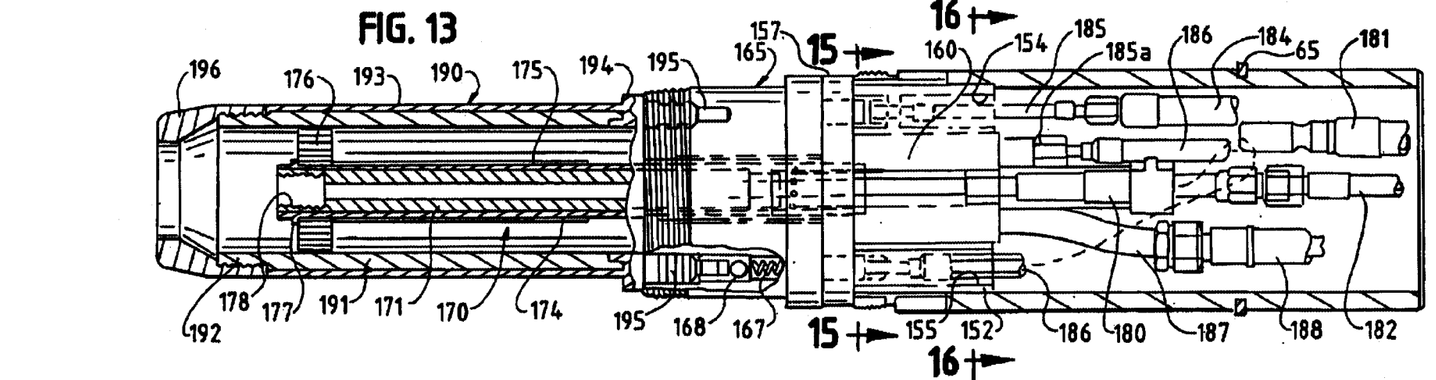
FIG. 13 is an enlarged view in vertical section through the machine barrel assembly of FIG. 11.

The body assembly 151 also includes a docking spool 165 which has formed therethrough a central electrode passage 166 and peripheral water passages 167, each incorporating a spring-biased, normally-closed valve 168 (one shown) of the type disclosed in my aforementioned U.S. patents. Disposed in the central passage 166 are two side-by-side, electrically insulating cylindrical tubes 169.

The body assembly 151 also includes two inner bodies 170 and 170A, which are substantially identical, wherefore only one will be described in detail. The inner body 170 includes an elongated cylindrical inner tube 171 which extends through the insulating tube 169, having a rear end extending into the associated body spool 160 and a forward end projecting well beyond the docking spool 165. The rear end of the inner tube 171 is encircled by a cylindrical gas shell 172 which communicates with a gas passage in the body spool 160 and cooperates with the inner tube 171 to channel gas forwardly to exit through a circumferential array of openings 173 (see FIG. 14) into the insulating tube 169. The inner tube 171 is telescopically received in a cylindrical outer tube 174 which extends forwardly from the gas shell 172 and is, in turn, received in a cylindrical insulating tube 175. A generally cylindrical spatter disk 176 having a plurality of small-diameter gas passages therethrough encircles the inner bodies 170, 170A just forwardly of the insulating tubes 175, being retained in place by retaining rings 177. The distal end of the outer tube 174 projects beyond the distal end of the inner tube 171 and is internally threaded as at 178.

In assembly, the nylon collar 157 is fitted over the inner bodies 170, 170A and up against the forward end of the housing 21A. Then the docking spool 165 is fitted over the inner bodies 170 and 170A and up against the nylon collar 157. The docking spool 165 has an annular flange at its rear end which is engaged by a cone nut 179, which is threadedly engageable with the collar 22 on the housing 21A for securing the docking spool 165 in place.

Respectively fixed to the rear ends of the body spools 160 and 160A and communicating with the electrode passages therein are wire electrode fixtures 180, 180A for respectively receiving wire electrode fittings 181 (one shown) (see broken line in FIG. 13) which can be secured in place by suitable set screws. Each body spool 160, 160A has a shielding gas supply line 182 coupled to a gas fitting 183 mounted in the rear of the body spool for communication with the gas passage 164. A water inlet hose 184 is coupled to a water inlet fitting 185, which extends through the outer passage 154 in the outer spool 152, which in turn communicates with the water inlet passage 167 in the docking spool 165. Another water inlet hose 184a is coupled via a coupler 184b to a water inlet fitting 185a on the body spool 160a for communication with the water passage 162 thereof. Coupled with the water passage 162 in the body spool 160 via a water inlet fitting 185a is an interconnect hose assembly 186 (see broken line in FIG. 13), which is in turn coupled through the other of the outer passages 155 in the outer spool 152 for communication with the other water passage 167 in the docking spool 165. Water out passages 163 in the body spools 160, 160A are respectively coupled to water out fittings 187 which are, in turn, coupled to a water out and electric cable assemblies 188 in a manner described above.

The machine barrel 50 includes a nozzle assembly 190 adapted to be mounted on or docked with the docking spool 165. The nozzle assembly 190 includes an elongated inner tube 191 provided with an externally threaded, reduced-diameter end 192 and telescopically received within a cylindrical outer tube 193. The rearward end of the nozzle assembly 190 is provided with a radially outwardly projecting annular collar 194 provided with rearwardly projecting water fittings 195 adapted to be respectively received in the water passages 167 in the docking spool 165 for opening the valves 168 and allowing water to flow to and from the nozzle assembly 190 for cooling same in a known manner. A tapered gas nozzle 196 is threadedly engaged with the distal end of the inner tube 191. The nozzle assembly 190 is secured in place on the docking spool 165 by means of a cone nut 197. Threaded current pickup tips 198 and 199 are respectively threadedly engaged with the distal ends of the inner bodies 170, 170A for slidably receiving the wire electrodes and imparting electrical current thereto.

It is significant that each of the body spools 160, 160A is provided with a water out and electric cable assembly 188 so that they can be independently connected to separate power sources. The electrical power is then transferred from the body spool 160 (160A) to the associated inner body 170 (170A), the pickup tip 198 (199) and thence to the associated consumable wire electrode.

Figure 14:
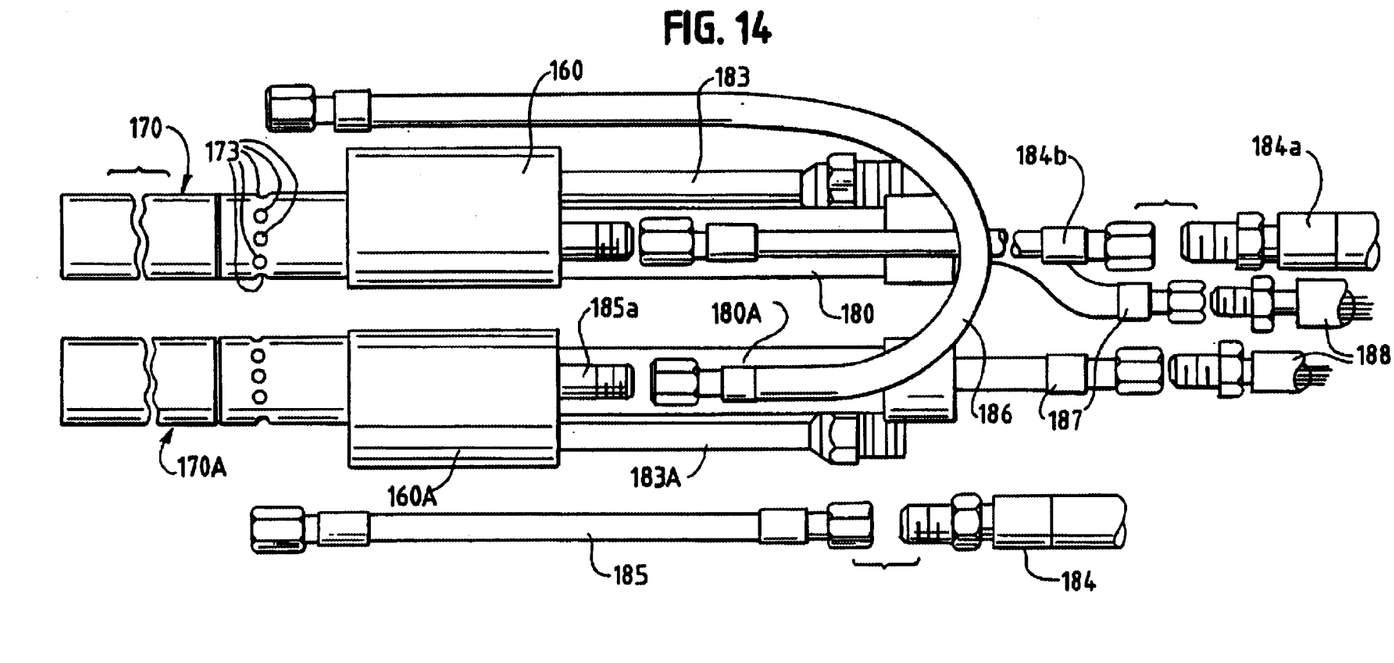
FIG. 14 is a further enlarged, exploded, fragmentary, bottom plan view of a portion of the machine barrel assembly of FIG. 13.

Referring to FIG. 14, in use inlet water is received through the hose 184 and fitting 185, which passes through the outer spool 152, outside of the body spools 160, 160A, into the nozzle assembly 190 via the upper water fitting 195, as shown in FIG. 13, from whence it recirculates through the nozzle assembly 190 for cooling thereof. The water is then returned through the interconnect hose assembly 186 to the body spool 160, water being fed directly to the body spool 160A via inlet hose 184a and coupler 184b. Water exits from the body spools 160, 160A via the water outlet fittings 187. Thus, the body spools 160, 160A and the nozzle assembly 190 are cooled.

Figures 15, 16, 17:
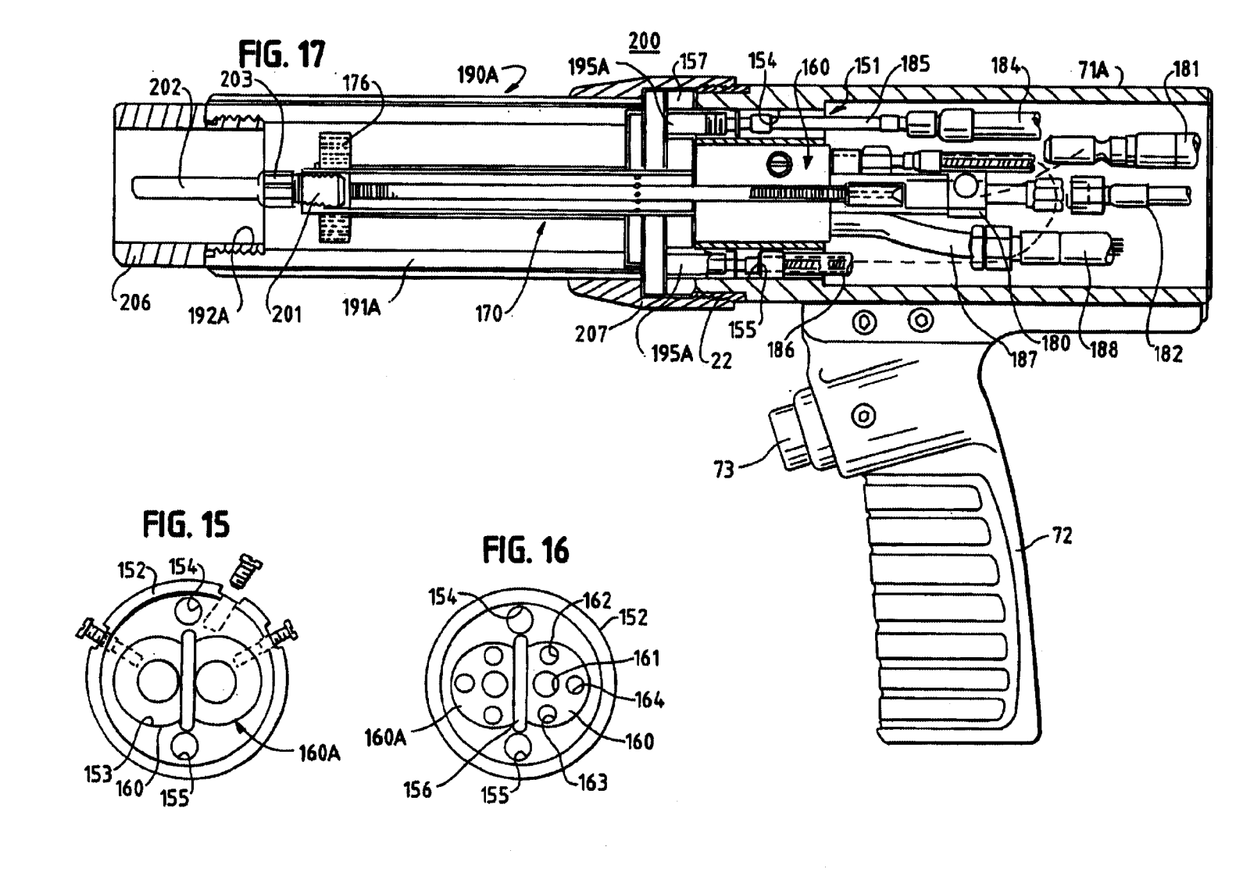
FIG. 15 is a sectional view taking generally along the line 15—15 in FIG. 13.
FIG. 16 is a sectional view taking generally along the line 16—16 in FIG. 13.
FIG. 17 is a view in partial section of a dual-electrode welding gun assembly powered by two separate power supplies.

Referring now to FIG. 17, there is illustrated a welding gun assembly 200, which is similar to the machine barrel 150 described above in connection with FIGS. 11–16, except that the docking spool 165 is eliminated and a modified nozzle assembly 190A plugs directly into the outer spool 152 of the body assembly 151. The gun assembly 200 has a body housing 71a, which is substantially similar to the body housing 71, described above in connection with FIGS. 4–6, having a pistol-grip handle 72 and trigger button 73. Mounted in the housing 71A is a body assembly 151 which is substantially the same as that described above in connection with FIGS. 11–16, except for the omission of the docking spool 165, wherefore like parts bear like reference numerals. The nozzle assembly 190a is substantially the same as the nozzle assembly 190, described above, except that it has an inner tube 191A which is internally threaded at its distal end. The internally threaded distal end of the inner body each of the inner bodies 170 (one shown) receives a collet nipple 201 which slidably receives therein a slip-in contact tip 202. The outer end of each of the collet nipples 201 is clamped to the associated tip by a collet nut 203 in substantially the same manner as was described above with the tips 61 and 62 in connection with FIGS. 1–3, above. A modified gas nozzle 206 is threadedly engaged with the internally threaded end of the nozzle assembly inner tube 191A.

Modified water fittings 195A of the nozzle assembly 190A plug directly into the outer passages 154 and 155 in the outer spool 152, for coupling directly to the fitting 185 and interconnect hose assembly 186, respectively. Since there are no valves in this embodiment, the water supply would have to be turned off before removal of the nozzle assembly 190A. The nozzle assembly 190A is secured in place by a cone nut 207 which threadedly engages with the threaded collar 22 of the housing 71A. In operation, the gun assembly 200 functions in substantially the same manner as the machine barrel 150 described above in connection with FIGS. 11–16.

It will be appreciated that, while each of the above-described embodiments has been illustrated using a particular one of three different types of adapter and/or tip assembly, each of the disclosed welding machine barrels or guns could use any disclosed type of adapter and/or tip assembly.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An arc welding apparatus for delivering two wire electrodes to a workpiece comprising:
    a body assembly adapted to be coupled to a source of electric power and directing the electrodes toward a working end of the apparatus,
    a nozzle assembly removably coupled to the body assembly for channeling other utilities to the working end,
    an adapter electrically and mechanically coupled to the body assembly for receiving the electrodes therefrom and maintaining the electrodes spaced from each other and being provided with two externally threaded collet nipples disposed at a distal end thereof, and
    two tips respectively slidably received in the collet nipples in electrical connection therewith and defining two channels for respectively slidably receiving and electrically contacting the electrodes and guiding them to the associated workpiece, and
    two collet nuts respectively threadedly engageable with the nipples for securing the tips in place whereby
    the tips are removable from the apparatus without rotation of the tips and without removing the nozzle assembly or the adapter.

2. The apparatus of claim 1, wherein the body assembly includes a body defining passages for respectively receiving the electrodes and a socket at a distal end of the body communicating with the passages, the adapter defining channels for respectively receiving the electrodes and being slidably receivable in the socket with the channels respectively communicating with the passages, and threaded fastening means for removably securing the adapter in the socket without rotation of the adapter relative to the socket.

3. The apparatus of claim 1, wherein the body assembly includes a body defining passages for respectively receiving the electrodes and an internally threaded socket at a distal end of the body communicating with the passages, the adapter having channels therein for respectively receiving the electrodes and being threadedly engaged in the socket to a mounted position with the channels respectively communicating with the passages.

4. The apparatus of claim 1, wherein each of the tips is threadedly engaged in the adapter.

5. The apparatus of claim 1, wherein the nozzle assembly has cooling water circulation passages therein, and further comprising conduits in the body assembly for passing cooling water from a source to the nozzle assembly and from the nozzle assembly to a drain.

6. The apparatus of claim 5, wherein the body assembly includes normally-closed valves in the conduits, the nozzle assembly including actuators engageable with the valves when the nozzle assembly is mounted on the body assembly for opening the valves.

7. The apparatus of claim 1, wherein the body assembly includes cooling water circulation passages therein, and means for coupling the conduits to a supply of cooling fluid.

8. The apparatus of claim 1, wherein the body assembly includes means for coupling to an associated source of shielding gas and conduits through the body assembly for passing the shielding gas to the nozzle assembly in surrounding relationship with the tips.

9. The apparatus of claim 1, wherein the apparatus includes a housing for the body assembly having a pistol-grip handle.

10. The apparatus of claim 1, and further comprising a housing for the body assembly and means for removably mounting the housing on an associated support in a fixed position.

11. In an arc welding apparatus for delivering to a workpiece first and second wire electrodes respectively adapted to be coupled to first and second sources of electric power, and including a nozzle assembly for channeling other utilities to a working end of the apparatus, the improvement comprising:

first and second bodies coupled to the nozzle assembly and adapted to be connected respectively to the first and second sources of electric power and respectively receiving the first and second electrodes for connecting the electrodes respectively to the first and second sources of electric power and for supporting the electrodes through the nozzle assembly, means for electrically insulating the first and second bodies from each other, and two tips respectively removably mechanically and electrically connected to the bodies for respectively slidably receiving and electrically contacting the first and second electrodes and guiding them to the associated workpiece.

12. The apparatus of claim 11, and further comprising means for detachably coupling the nozzle assembly to the bodies.

13. The apparatus of claim 12, wherein the coupling means includes a docking body removably coupled to the bodies, and means for removably mounting the nozzle assembly on the docking body.

14. The apparatus of claim 13 wherein the nozzle assembly includes cooling fluid recirculation conduits therein, the body assembly having cooling fluid passages therethrough communicating with the conduits, and means on the body assembly for coupling the passages to an associated supply of cooling fluid.

15. The apparatus of claim 14, wherein the docking body includes normally-closed valves respectively disposed in the passages, the nozzle assembly including actuators engageable with the valves when the nozzle assembly is mounted on the docking body for opening the valves.

16. The apparatus of claim 14, wherein the means for coupling to an associated cooling fluid supply includes means for connection to the first and second sources of electric power.

17. The apparatus of claim 14, and further comprising means for circulating cooling fluid through each of the first and second bodies.

18. The apparatus of claim 11, and further comprising means for threadedly coupling the two tips respectively to the first and second bodies.

19. The apparatus of claim 11, and further comprising means for coupling each of the first and second bodies to a supply of shielding gas, and passages in the first and second bodies for passing shielding gas to the nozzle assembly in surrounding relationship with the tips.

20. The apparatus of claim 11, and further comprising a housing enclosing the first and second bodies and adapted to be removably mounted on an associated fixed support.

21. An arc welding apparatus for delivering two wire electrodes to a workpiece comprising:

a body assembly adapted to be coupled to a source of electric power and directing the electrodes toward a working end of the apparatus, a nozzle assembly removably coupled to the body assembly for channeling other utilities to the working end, an adapter electrically and mechanically coupled to the body assembly for receiving the electrodes therefrom and maintaining the electrodes spaced from each other, and a tip assembly removably mounted on the adapter in electrical connection therewith and including a single tip body defining two channels for respectively slidably receiving and electrically contacting the electrodes and guiding them to the associated workpiece, whereby the tip assembly is removable from the apparatus without removing the nozzle assembly or the adapter.

* * * * *